United States Patent [19]

Henderson

[11] Patent Number: 5,356,847
[45] Date of Patent: Oct. 18, 1994

[54] NICKEL CATALYST

[75] Inventor: John H. Henderson, Solon, Ohio

[73] Assignee: Engelhard Corporation, Iselin, N.J.

[21] Appl. No.: 974,264

[22] Filed: Nov. 10, 1992

[51] Int. Cl.$^5$ .......................... B01J 21/16; B01J 23/70
[52] U.S. Cl. ...................................... 502/84; 502/234; 502/259
[58] Field of Search .................... 502/84, 234, 259

[56] References Cited

U.S. PATENT DOCUMENTS

| | | | |
|---|---|---|---|
| 1,143,332 | 6/1915 | Sulzberger | 502/259 |
| 2,566,362 | 9/1951 | Paterson | 502/234 |
| 2,812,342 | 11/1957 | Peters | 260/409 |
| 2,904,608 | 9/1959 | Holm | 502/259 |
| 3,001,952 | 9/1961 | Reitmeier et al. | 252/455 |
| 3,352,913 | 11/1967 | Schmitt et al. | 502/84 |
| 3,691,100 | 9/1972 | Wright | 252/458 |
| 4,160,745 | 7/1979 | Murrell et al. | 252/466 J |
| 4,174,302 | 11/1979 | Murtha | 252/455 R |
| 4,263,173 | 4/1981 | Carter et al. | 252/452 |
| 4,280,961 | 7/1981 | Schneider et al. | 260/412.8 |
| 4,317,748 | 3/1982 | Torok et al. | 252/472 |
| 4,366,332 | 12/1982 | Chao et al. | 568/863 |
| 4,584,140 | 4/1986 | Blewett et al. | 260/412.8 |
| 4,599,469 | 7/1986 | Cymbaluk et al. | 570/193 |
| 4,605,676 | 8/1986 | Kobylinski et al. | 518/700 |
| 4,982,020 | 1/1991 | Carduck et al. | 568/864 |

FOREIGN PATENT DOCUMENTS

| | | | |
|---|---|---|---|
| 0167201 | 6/1985 | European Pat. Off. | B01J 23/74 |
| 0360554 | 9/1989 | European Pat. Off. | B01J 23/74 |
| 2444389 | 4/1975 | Fed. Rep. of Germany. | |
| 0276912 | 7/1970 | U.S.S.R. | 502/84 |

OTHER PUBLICATIONS

M. T. Rodrigo et al in "Applied Catalysis A: General" 88; 1992 (101–114), Elsevier Science Publishers B.V., Amsterdam.

*Primary Examiner*—Carl F. Dees

[57] ABSTRACT

A formed nickel catalyst useful in fixed bed hydrogenation of fatty materials is described. The catalyst comprises from about 10% to about 50% by weight of nickel and from about 3% to about 30% by weight of at least one clay mineral binder. The catalyst may also contain from about 20% to about 60% by weight of silica and from about 1% to about 10% by weight of alumina. A process also is described for preparing such formed nickel catalyst. The use of such nickel catalyst in the hydrogenation of fatty materials such as fatty acids and esters also is described.

20 Claims, No Drawings

NICKEL CATALYST

FIELD OF THE INVENTION

The present invention relates to formed nickel catalysts which are useful in fixed bed hydrogenation reactions. More particularly, the invention relates to formed nickel catalysts useful in fixed bed hydrogenation of fatty materials such as fatty acids and fatty esters. The invention also relates to the process of preparing such catalysts and to the use of such catalysts in hydrogenating fatty acids and esters.

BACKGROUND OF THE INVENTION

Supported metal catalysts are known, and their use in numerous reactions, including the hydrogenation of fatty materials, has been described extensively in the literature. Supported nickel catalysts have been utilized in various hydrogenation processes where low IV (iodine value) fatty products are desired. A low IV is obtained when the product is completely or essentially completely saturated.

Fatty acid hydrogenations can be accomplished either in a slurry phase with a powdered catalyst or in a fixed bed with a formed catalyst. The normal catalyst of choice is based on reduced nickel as the catalytic species. However, nickel, and especially any nickel oxide, nickel hydroxide, or nickel carbonate present in the catalyst tends to react with the fatty acids to form nickel soaps. These soaps can redeposit on the catalyst or can be removed from the catalyst and accumulate in the slurry phase or can be carried off in the fatty acid liquid in a fixed bed reaction. As the amount of soap deposited on the catalyst increases, the activity of the catalyst decreases. In addition, any dissolved nickel soaps which are carried into the product can be deleterious to the quality of the reduced product.

The term "supported nickel catalyst" can be defined as a catalyst wherein the nickel precursor is deposited on a refractory metal oxide support by means of impregnation or precipitation to distribute the nickel metal as small crystallites upon the support. Examples of patents describing various nickel-containing supported catalysts and their use in catalytic hydrogenation reactions include U.S. Pat. Nos. 2,812,342 and 3,691,100. U.S. Pat. No. 2,812,342 discloses the hydrogenation of structurally modified acids using conventional catalysts such as Raney nickel catalysts and hydrogen. U.S. Pat. No. 4,317,748 describes a process for the preparation of supported nickel catalysts which are useful as hydrogenation catalysts, particularly for the hydrogenation of fatty materials. Examples of support materials include alumina, silica, silica gel, fumed silica, naturally occurring clays such as montmorillonite and montmorillonite-rich minerals, carbon black, activated charcoal, etc. The catalysts described in the '748 patent are typically free-flowing powders containing 25 % to 75 % nickel. In particular, the supported nickel catalysts are prepared by a process involving contacting a solid support material and nickel soap of a monocarboxylic acid in an inert hydrocarbon until the nickel is associated with the support. The nickel-bearing support material is then subjected to a sulfiding step followed by precipitation of nickel metal thereon. The use of an inert hydrocarbon is an essential feature of the process.

U.S. Pat. Nos. 4,174,302 and 4,3 17,748 describe catalysts which contain nickel and support materials which include day. In particular, U.S. Pat. No. 4,174,302 describes a catalyst for producing cycloalkylaromatics from aromatic hydrocarbons in the presence of hydrogen wherein the catalyst consists essentially of ruthenium, nickel and a support material selected from the group consisting of active clay and silica-alumina. The catalyst contains from about 0.01 to 0.3 weight percent of ruthenium and from about 0.03 to 1 weight percent nickel. U.S. Pat. No. 4,317,748 is described above, and U.S. Pat. No. 4,584,140 describes a process for separating fatty materials from spent supported nickel catalyst composition which may also contain non-nickel-containing clays/earths.

The preparation of nickel catalysts supported on natural silicates is described by M. T. Rodrigo et al in "Applied Catalysis A: General", 88; 1992 (101–114), Elsevier Science Publishers B.V., Amsterdam. Four Spanish silicates are described as useful supports:seprolite, palygorskite, bentonitc and diatomitc. The powdered catalysts described in this article were prepared containing from 8.4 to 12 % nickel. The activity of the catalysts was found to be almost independent of the nature of the support, whereas differences in selectivity were ascribed to differences in the morphology of the support.

SUMMARY OF THE INVENTION

A formed nickel catalyst useful in fixed bed hydrogenation of fatty materials is described. The catalyst comprises from about 10% to about 50% by weight of nickel and from about 3% to about 30% by weight of at least one clay mineral binder. The catalyst may also contain from about 20% to about 60% by weight of silica and from about 1% to about 10% by weight of alumina. A process also is described for preparing such formed nickel catalyst. The use of such nickel catalyst in the hydrogenation of fatty materials such as fatty acids and esters also is described.

DESCRIPTION OF THE PREFERRED EMBODIMENTS

The formed nickel catalysts of the present invention comprise from about 10% to about 50% by weight of nickel and from about 3 % to about 30% by weight of at least one clay mineral binder. In a preferred embodiment, the catalyst is a supported catalyst wherein the support comprises refractory metal oxides including synthetic inorganic oxides of silicon, magnesium, calcium, alumina, zinc, and mixtures thereof. Generally, the refractory metal oxide support can be alumina or silica or mixtures of alumina and silica. Throughout this specification and claims the weight percents of nickel are based on the total weight of the catalyst and are calculated as the metal.

Accordingly, in one embodiment, the catalyst of the present invention will comprise from about 10% to about 50% by weight of nickel, from about 20% to about 60% of silica, from about 1% to about 10% by weight of alumina, and from about 3 % to about 30% by weight of at least one clay mineral binder. One method by which such catalyst can be prepared is described below.

An essential component of the formed nickel catalyst of the present invention which is useful particularly in the fixed bed hydrogenation of fatty materials is at least one clay mineral binder. The amount of clay mineral incorporated into the formed catalyst is an amount which is sufficient to bind the components together and maintain the shape of the formed catalyst. As noted above, the catalysts may contain from about 3 % to about 30% by weight of the clay mineral binder, and in another embodiment, the catalysts contain from about 5 % to about 20% of clay mineral binder.

Clays may be broadly defined as containing the elements silicon, aluminum, oxygen, iron, magnesium and various alkaline earth elements. They are generally hydrated silicates of aluminum, iron or magnesium and may be crystalline or amorphous. Crystalline clays are most common and are identified and classified primarily on the basis of crystal structure and the amount and locations of charge with respect to the basic lattice.

The clay minerals which may be employed as binders in the formed catalysts of the present invention may be any of the common crystalline clay minerals such as the kaolin group, the illite group, the montmorillonite or smectite group, the chlorite group, the vermiculite group, the sepiolite and attapulgite group, etc. Examples of the kaolin group clays include kaolinite, dickite and nacrite which are silicoaluminous clays and all are considered to have the chemical formula $2SiO_2.Al_2O_3.2H_2O$; and halloysite which is also exclusively silicoaluminous. Other species of the kaolin group are distinguished by the partial replacement of aluminum by iron, magnesium, nickel or manganese. The montmorillonite or smectite group is characterized by finely grained, thin-layered microcrystals. The layers are not tightly bound one to another and, therefore, these clays absorb and adsorb materials. The most familiar of this group is montmorillonite. Related species include beidellite in which silicon is partially replaced by aluminum; nontronite in which aluminum is partially replaced by iron; saponite and stevensite in which aluminum is partially replaced by magnesium.

Examples of clays composed predominantly of kaolinite are china clays, kaolines, ball clays, fire clays and flint clays. Often, the terms china clay and kaolin are used interchangeably. Other specific examples of useful clays include diaspore clay which is a hydrated aluminum oxide with an $Al_2O_3$ content of about 85 % and a water content of about 15 %. Bentonites are aluminum silicate clays which are also referred to as sodium smectites. In one preferred embodiment of the invention, the clay which is utilized as a binder is selected from attapulgite, bentonite and kaolinite. Particularly useful attapulgite clays are available from the Engelhard Corporation under the general trade designation Attagel ®. For example, Attagel ® 50 is a dry powder having a B.E.T. surface area of 150 $m^2/gm$, and Attagel ® 40 is a dry powder having a B.E.T. surface area of about 140 $m^2/gm$. These products typically contain about 66% $SiO_2$, 12.2% $Al_2O_3$, 11.5% MgO, 3.6% $Fe_2O_3$ and 4.3% CaO.

The catalysts of the present invention also may contain small amounts of at least one silica support material. The amount of silica support material may be varied although amounts of from about 0.5 % to about 10% are presently preferred. Various silica support materials may be utilized including diatomites such as diatomaceous earth (Kieselguhr) or perlite. Diatomites generally contain about 85-90% $SiO_2$ and about 3-5% of $Al_2O_3$. For example, a diatomaceous earth such as Celite FC available from Manville Corp. may be incorporated into the catalyst of the present invention.

The present invention also includes a method of preparing the formed nickel catalyst of the present invention. The process comprises (A) preparing an aqueous acidic mixture of nickel ions and a solid porous support material;
(B) combining the aqueous acidic mixture of (A) with an aqueous alkaline mixture of an alkali metal silicate and an inorganic base whereby the nickel and silicate ions are precipitated onto said support material to form a catalyst;
(C) recovering the support material containing the precipitated nickel and silicate ions;
(D) preparing a mixture of water, a clay mineral and the support material containing the precipitated nickel and silicate ions; and
(E) forming the mixture into the desired shape.

After the mixture is formed into the desired shape, the catalyst may be dried and calcined at an elevated temperature. The calcined catalyst may then be activated by reduction with a reductant.

In one embodiment, an additional silica support material as described above may be added to the mixture or slurry obtained in step (B) after the nickel and silicate ions derived from the mixture prepared in step (A) have been precipitated into the support material but before the precipitate containing the nickel and silicate ions is recovered in step (C). The amount of silica support material added to the mixture is an mount sufficient to provide a catalyst containing about 0.5 to about 10% of the silica support material. The silica support material in the catalyst is to be distinguished and is different from the $SiO_2$ present in the catalyst which is derived from the alkali metal silicate contained in the aqueous alkaline mixture used in step (B).

In another embodiment the material recovered in step (C) may be washed with water and/or dried with air blowing or at an elevated temperature prior to proceeding with step (D).

The nickel ions which are present in the aqueous acidic mixture prepared in step (A) may be derived from any nickel source which is soluble in acidic water. For example, the nickel ions may be derived from a nickel halide such as nickel chloride. Other nickel sources include nickel nitrate hexahydrate, nickel carbonate, nickel acetate, etc. The amount of nickel ions present in the aqueous acidic mixture used prepared in step (A) is an amount which is sufficient to provide the final catalyst with the desired nickel content which is described above as between from about 10% to about 50% by weight. The acidity of the aqueous mixture is controlled by the amount of acid added to the mixture. Generally, a mineral acid such as hydrochloric acid or nitric acid is utilized. The pH of the aqueous acidic mixture used in step (A) generally is in the range of from less than 1 to about 5. The aqueous acidic mixture used in step (A) is generally prepared by adding the nickel compound to water followed by the addition of the inorganic acid to acidify the mixture to the desired pH. This mixture generally is heated to a temperature such as from about 30° C. to about 60° C., and the support material is then added. Following the addition of the support material, the mixture is heated to about 75° C. or 80° C.

The solid porous support material incorporated into the aqueous mixture used in step (A) may be any refractory metal oxide support such as alumina, silica, zinc oxide, zirconium oxide and mixtures thereof. Alumina is a preferred support material of the present invention. Specific examples of useful commercially available aluminas include certain members of the Versal family of aluminas available from Kaiser Aluminum and Chemical Corporation; and Boehmite aluminas such as Catapal aluminas sold by Vista Chemical Company and Pural (Boehmite) available from Condea Chemie. Mixtures of these aluminas can also be used as the support material for the catalyst of the present invention. The amount of support material is an mount which is sufficient to provide the final catalyst with from about 1% to about 10% by weight of the support material.

The second aqueous mixture which is utilized in the process of the present invention is an aqueous alkaline mixture of an alkali metal silicate and an inorganic base. Alkali metal silicates such as sodium or potassium silicates may be utilized to prepare the mixture and the inorganic base is preferably an alkali metal base such as sodium hydroxide, potassium hydroxide or a precursor such as sodium oxide, potassium oxide, etc. The aqueous alkaline mixture generally is prepared by adding the inorganic base or base precursor to water and thereafter adding the alkali metal silicate.

The aqueous acidic mixture containing the nickel ions and the support material, and the aqueous alkaline mixture containing the alkali metal silicate are combined whereupon the nickel and silicate ions are precipitated onto the support material. Although the two mixtures may be combined in any manner, it is generally preferred that the aqueous alkaline mixture is added to the aqueous acidic mixture over a period of time such as from about 0.5 to about 2 hours with stirring while maintaining the temperature at about 70°-80° C. When the addition of the aqueous alkaline mixture is completed, the pH of the combined mixture is adjusted to about 8 to 9, generally with an aqueous solution of sodium or potassium hydroxide.

The support material containing nickel and silicate ions is then recovered from the slurry by any technique known to those skilled in the art including filtration, settling, centrifuging, etc. The solids thus recovered may be washed with water and dried by heating to temperatures up to about 100°-110° C. or higher for periods of from about 1 to about 8 hours.

The catalyst is prepared from the support material containing nickel and silicate ions by preparing a formable mixture of water, clay mineral and the precipitated material containing nickel and silicate ions, and thereafter forming the mixture into a catalyst having the desired shape. Generally, this mixture is prepared by adding the clay to the precipitated, supported material and mixing to obtain an intimate mixture. Water is then added to the mixture, and the amount of water added should be an amount which is sufficient to form a mix which is suitable for the forming process, for example, an extrudable mix. The amount of clay mineral included in the mixture is an amount which will provide the catalyst with from about 5% to about 25% by weight of the clay binder. Thus, the amount of clay mineral contained in the formable (e.g., extrudable mixture) will range from about 5% to about 20% or even 30% by weight based on the weight of the precipitated, supported material containing the nickel and silica.

The formed nickel catalyst of the present invention may be prepared in any desired shape by a variety of forming procedures including extrusion, briquetting, tabletting, etc. Thus, the shape of the catalyst can be in the form of extruded, briquetted or tabletted cylinders, polylobal extrusions, spheres, rings, hollow core cylinders, or any other appropriate geometric shape. The different forming techniques may require mixes with different moisture contents as will be readily apparent to those skilled in the art.

In one preferred embodiment, the formed catalysts of the invention are prepared by extruding the above-described mixtures to form an extrudate. The size and shape of the extrudate can be varied over a wide range although the size generally is from about 1/32-inch to about ⅜-inch in diameter.

The dried catalyst may be calcined and thereafter reduced or reduced directly in hydrogen. Generally, the dried catalyst is calcined by heating with flowing air or inert gas to a temperature of from about 110° C. to about 600° C. or higher, preferably from about 350° C. to about 500° C. The time and temperature of the calcination should be sufficient to decompose the metal salts, convert the metals to metal oxides and to fix the metal oxides in this support. Any type of calciner, such as a rotary kiln, tunnel kiln, vertical calciner, etc., can be used so long as the metals are converted to metal oxides.

The formed and calcined catalyst described above can be activated by reduction at an elevated temperature in the presence of a gaseous reductant such as hydrogen. At least a potion of the nickel in the catalyst should be reduced. The reduced catalyst can then be stabilized by depositing a mono-molecular layer of carbon dioxide on the catalyst to prevent spontaneous oxidation of the highly active nickel when the catalyst is exposed to the air. In one embodiment, the calcined catalyst of the present invention is reduced with hydrogen at a temperature of about 75°-500° C., more often 400°-500° C. and thereafter cooled to about 50° C. and stabilized by contacting the reduced catalyst with carbon dioxide.

The following examples illustrate the catalysts of the present invention and their method of preparation. Unless otherwise indicated, all parts and percentages are by weight, temperatures are in degrees Centigrade, and pressures are at or near atmospheric pressure.

EXAMPLE 1

A mixture of 27.474 Kg of an aqueous nickel chloride solution containing 13.42% nickel, 282 grams of concentrated nitric acid and 13.4 gallons of water is prepared in a reactor vessel, and 694 grams of Pural alumina are added. The temperature of the mixture is raised to about 75° C.

In a separate vessel, a mixture of 43 gallons of water and 7.693 Kg of a 50% aqueous sodium hydroxide solution is prepared. To this mixture there are added 12.388 Kg of a sodium silicate solution containing 28.9% $SiO_2$. The $SiO_2/Na_2O$ ratio in the sodium silicate is about 3.25:1. The mixture in the second vessel is then added slowly with stirring to the mixture in the reaction vessel over a period of about one hour while maintaining the temperature at about 75° C. When all of the second solution has been added, the pH of the mixture in the reaction vessel is adjusted to between about 8 and 9 with a 50% aqueous sodium hydroxide solution. The mixture in the reaction vessel is heated to 94°-97° C. and maintained at this temperature for one hour. The reaction mixture is then quenched with 30 gallons of water, and 1.239 Kg of Celite F.C. are added to the reactor and the slurry is mixed for about 10 minutes. The slurry is then pumped into a filter press, faltered, and the residue is washed overnight. The washed residue is then blown with air for 30 to 45 minutes, removed from the press and dried at 105° C. for 2 to 6 hours. The dried residue is then milled to a powder.

To a mixer there are charged 309.09 Kg of the dried solid prepared above and 37.27 Kg of Attagel 50. The mixture is mixed for 2 to 5 minutes whereupon 186.36 Kg of water are added over a period of 5 to 8 minutes while stirring. This mixture is stirred for an additional 20 minutes and then extruded through a 0.070-inch cylindrical dye. The extrudate is dried at about 150° C. (300° F.). The dried extrudate is then calcined at a temperature of 390° C. for one hour, reduced with hydrogen for 2 hours at about 450° C. and then for an additional period of time as the catalyst is cooled to 50° C. and then stabilized with carbon dioxide. Analysis of the catalyst thus obtained indicates a nickel content of about 32%, a nickel crystallite size of about 85Å, and a crush strength of about 12.3 pounds per 3/16-inch.

EXAMPLE 2

The general procedure of Example 1 is repeated except that only 18.64 Kg of Attagel 50 are used. The catalyst prepared in this manner contains 33.7% nickel, has a nickel crystallite size of 75Å and a crushing strength of 9.5 pounds per 3/16-inch.

EXAMPLE 3

The procedure of Example 1 is repeated except that the Attagel 50 is replaced by the 37.27 Kg of Bentonite (200 mesh green bond SJ from Ashland Chemical Co.). The catalyst prepared in this manner contains 31.4% nickel, has a nickel crystallite size of 70Å and a crush strength of 7.0 pounds per 3/16-inch.

EXAMPLE 4

The procedure of Example 1 is repeated except that the Attagel is replaced by 37.27 Kg of kaolin (Kaolin ASP-400 available from Engelhard Corporation). The catalyst prepared in this manner contains 32.6% nickel, has a nickel crystallite size of 70Å and a crush strength of 12.8 pounds per 3/16-inch.

CONTROL EXAMPLE

The procedure of Example 1 is repeated except that the Attagel is replaced by 37.27 Kg of Catapal® Boehmite alumina available from Vista Chemical Co. The catalyst prepared in this manner contains 32.2% nickel, has a crystallite size of 90Å and a crush strength of 12.9 pounds per 3/16-inch. In this case, an acid is added to peptize the alumina.

The formed nickel catalysts of the present invention are useful particularly in fixed bed hydrogenation reactions, and more particularly, in the hydrogenation of fatty materials such as fats and oils in components thereof, particularly unsaturated fatty acids and fatty acid esters, such as oleic acid, linoleic acid, tall oil acid, methyl oleate, methyl linoleate, ethyl oleate, etc. The fatty materials are hydrogenated by contacting the fatty materials with hydrogen and a catalyst of the present invention under catalytic hydrogenation conditions. Preferably, the hydrogenation is accomplished in a fixed bed reactor system.

As mentioned above, one of the difficulties of using nickel-containing supported catalysts, particularly in a fixed bed hydrogenation reaction, is that the nickel present in the catalyst tends to react with fatty acids and fatty esters to form nickel soaps, and these soaps can be deposited on the catalyst or they can accumulate in the reduced fatty acid product. As a result, the activity of the catalyst is diminished, and the dissolved nickel soaps have a deleterious effect on the quality of the hydrogenated fatty acid obtained. However, it has now been observed that when a fixed bed hydrogenation is carried out on fatty materials utilizing the catalyst of the present invention, the catalyst is very effective in producing hydrogenated fatty acids, and there is a significant reduction in the amount of nickel contained in the product when compared to a similar catalyst using other binders such as alumina. In addition, the amount of aluminum contained in the fatty oil product as a result of the dissolution of aluminum from the binder is significantly less than the amount of aluminum present in the product obtained using a control catalyst which is identical to the catalyst of the present invention except an equivalent amount of Catapal alumina is used as the binder. It is obviously undesirable to obtain hydrogenated fatty acids which contain significant amounts of nickel and/or aluminum.

The ability of the catalyst of the present invention to reduce fatty materials and to produce hydrogenated fatty materials containing reduced amounts of nickel and aluminum is demonstrated by comparing the results obtained with the catalysts of the invention as described in Examples 1, 3 and 4 with the results obtained with the Control Catalyst described above which was prepared by the same procedure utilized to prepare the catalyst of the present invention except that the clay component was replaced by an equivalent amount of alumina. The procedure for this evaluation involved loading about 30 grams of the formed, reduced and stabilized nickel catalyst into a reactor tube and then allowing a bleached tallow fatty acid having an iodine value of 51 and hydrogen to flow from above through the formed catalyst. The product is collected from the other end of the reactor tube and analyzed for unsaturation (iodine value), ppm of nickel, and ppm of aluminum. Samples are taken every 15 minutes over a test period of 3 hours during which time the catalytic activity is reasonably constant. The results of this evaluation are summarized in the following table.

TABLE

| Catalyst of Example | Hydrogenation Results | | |
|---|---|---|---|
| | Iodine Value | Ni (ppm) | Al (ppm) |
| 1 | 34.1 | 8 | <10 |
| 3 | 36.0 | 3 | <10 |
| 4 | 29.8 | 5 | 20 |
| Control | 38.7 | 120 | 120 |

As can be seen from the above results, the catalysts of the present invention which contain clay are more effective in the hydrogenation of the fatty acid (lower iodine value), and the product obtained contains significantly less nickel and aluminum contamination than the product obtained with the Control Catalyst. These results indicate that the alumina and active nickel contained in the catalyst of the present invention remain in the catalyst, and the catalyst retains its integrity by retaining the binder and remains effective for a longer period of time than the control catalyst because the nickel remains in the catalyst.

While the invention has been explained in relation to its preferred embodiments, it is to be understood that various modifications thereof will become apparent to those skilled in the art upon reading the specification. Therefore, it is to be understood that the invention disclosed herein is intended to cover such modifications as fall within the scope of the appended claims.

I claim:

1. A formed nickel catalyst supported by a refractory metal oxide support material, said formed supported catalyst being useful in fixed bed hydrogenation of fatty materials and comprising from about 10% to about 50% by weight of nickel and from about 3 to about 30% by weight of at least one clay mineral binder.

2. The catalyst of claim 1 having an $SiO_2$ content of from about 20% to about 60% by weight.

3. The catalyst of claim 1 wherein the refractory metal oxide support material comprises alumina present in the amount from about 1% to about 10% by weight of the catalyst.

4. The catalyst of claim 1 containing from about 25% to about by weight of nickel.

5. The catalyst of claim 1 wherein the clay mineral is a montmorillonite, kaolinite or attapulgite clay.

6. The catalyst of claim 1 containing from about 5% to about 20% by weight of the clay binder.

7. A formed nickel catalyst comprising (i) nickel supported on a refractory metal oxide support material and (ii) at least one clay mineral binder, said formed supported catalyst being useful in fixed bed hydrogenation of fatty acids and esters and comprising from about 25% to about 45% by weight of nickel, from about 25% to about 45% $SiO_2$, from about 1% to about 10% by weight of $Al_2O_3$.

8. The catalyst of claim 7 also containing from about 0.5% to about 10% by weight of at least one silica support material.

9. The catalyst of claim 8 wherein the silica support material is diatomaceous earth.

10. A process for preparing a supported and formed catalyst which comprises (A) preparing an aqueous acidic mixture of nickel ions and a solid refractory metal oxide support material;

(B) combining the aqueous acidic mixture of (A) with an aqueous alkaline mixture of an alkali metal silicate and an inorganic base whereby the nickel and silicate ions are precipitated onto said support material;

(C) recovering the support material containing the precipitated nickel and silicate ions;

(D) preparing a mixture of water, a clay mineral and containing the precipitated nickel and silicate ions; and (E) forming the mixture into a catalyst of the desired shape.

11. The process of claim 10 wherein the catalyst formed in step (E) is dried and calcined at a temperature of from about 110°–600° C.

12. The process of claim 10 wherein the support material in the mixture used in step (A) is alumina, silica or a mixture of alumina and silica.

13. The process of claim 10 wherein the inorganic base in (B) is an alkali metal hydroxide.

14. The process of claim 10 wherein the clay mineral is a montmorillonite, kaolinite or attapulgite clay.

15. The process of claim 10 wherein diatomaceous earth is added to the mixture obtained in step (B) prior to recovery of the catalyst in step (C).

16. The process of claim 10 wherein the aqueous mixture of (A) is combined with the aqueous alkaline mixture of (B) by the addition of the aqueous alkaline mixture to the aqueous acidic mixture.

17. The process of claim 11 which additionally includes the step of reducing at least a portion of the nickel in said catalyst at an elevated temperature in the presence of a reductant.

18. The process of claim 17 wherein the reductant is a gaseous reductant.

19. The process of claim 18 wherein the reductant is hydrogen.

20. The process of claim 17 wherein the reduced catalyst is stabilized by contact with carbon dioxide.

* * * * *